March 23, 1926.

H. MÜLLER

ADJUSTABLE CLAMP

Filed June 20, 1925

1,577,868

INVENTOR
Henry Müller
BY
ATTORNEY

Patented Mar. 23, 1926.

1,577,868

UNITED STATES PATENT OFFICE.

HENRY MÜLLER, OF WATERBURY, CONNECTICUT.

ADJUSTABLE CLAMP.

Application filed June 20, 1925. Serial No. 38,400.

*To all whom it may concern:*

Be it known that I, HENRY MÜLLER, a citizen of the United States, and a resident of Waterbury, in the county of New Haven and State of Connecticut, have invented the new and useful Adjustable Clamp, of which the following is a specification.

The present invention relates to an adjustable clamp or vise. While it is suitable for use for various purposes, it is more particularly devised for use by carpenters in clamping boards together.

The present invention contemplates an adjustable clamp or vise, which can readily be brought into approximate adjustment, and in which the final adjustment and the final clamping may be performed through the instrumentality of a screw carried by the frame, and cooperating with a pivoted lever.

An object of the invention is to provide a clamp for this purpose, which may be made up from a small number of parts capable of ready assembly, quick and easy adjustment, and able to securely clamp the materials between its jaws.

Other and further objects of the invention will appear as the description proceeds.

In the accompanying drawing there is shown, for purposes of illustrating the invention, one of the many possible embodiments in which the present invention may take form, it being understood that the drawing is illustrative of the invention which may be embodied in various forms.

Figures 1, 2:
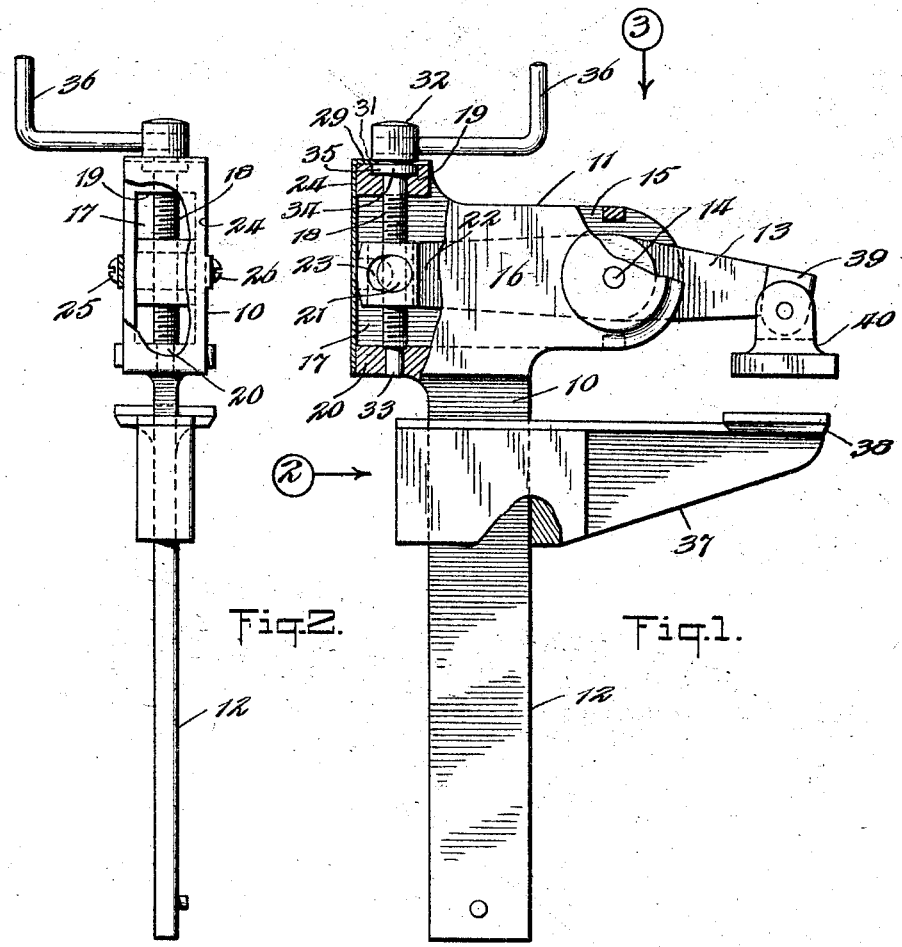
Fig. 1 is a side elevational view of the clamp or vise, with parts broken away.
Fig. 2 is a view taken in the direction of the arrow 2 of Figure 1, parts being broken away.
Figure 3:
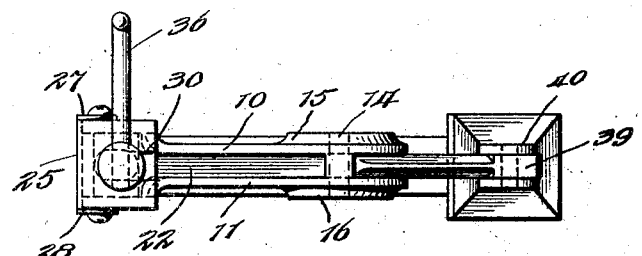
Fig. 3 is an end view taken in the direction of arrow 3 of Figure 1.

A strong rigid frame 10, which may be in the form of a casting, is provided with a cross-head 11, and a laterally extending bar 12. This cross-head is bifurcated, as indicated in the drawings, so as to accommodate a lever 13, pivotally mounted at 14 between the bifurcations 15 and 16 and to one side of the bar 12.

The opposite end of the cross-head is provided with a rectangular opening 17, and a screw-threaded bolt 18 is mounted in the end walls 19 and 20 of the opening. This screw carries a traveling nut 21, which engages in a suitable manner with the left end 22 of the lever 13. As here shown, this end of the lever is bifurcated so as to span the screw 18, and the traveling nut 21 is passed through slots 23 in the bifurcations of the lever. These slots provide for the lost motion necessary between the fixed screw and swinging lever. Various other forms of construction may be used to interconnect the screw and swinging lever.

A cover or cap 24 is placed over the opening 17 in the frame, so as to cover and protect the screw and lever, and to prevent the entrance of foreign matter. As here shown this cover is fastened in place by screws 25 and 26, which pass through ears 27 and 28. The upper end 30 is bent over, and slotted as indicated, so that it may be passed downwardly through a groove 31, in the head 32 of the bolt 18, to lock this bolt in place. When the bolt is made in the form shown in the drawings, it is provided with a small bearing end 33, adapted to be carried in the hole in the end wall 20. The inner portion 24 of the head of the screw is carried in a recess 25 in the end wall 19 of the opening, and a handle 36 is attached to the head of the screw so that it can be readily turned.

The laterally extending bar 12, of the frame, is here shown as made smooth, and a movable abutment member 37 is slidably carried on the bar. The free end 38 of the abutment member is placed opposite the free end 39 of the lever, which is preferably provided with a pivoted jaw member 40.

The abutment member may be moved readily along the bar to bring it to approximately the proper adjustment, and one may then clamp the work between the jaws of the vise or clamp, by turning the handle 36, which will cause the nut 21 to move along the threads, thereby swinging the lever 13 to bring the movable head 40 closer to the abutment. The application of pressure to the abutment member will cause it to bind on the bar 12 in such a manner that it can not slide, and the work is therefore securely clamped in place. The thrust imparted to the screw will be taken care of by the engagement of the head of the screw with the frame.

Where it is desired to provide a vise or clamp with a permanently mounted abutment member, it is of course obvious that the abutment member can be made a part of the frame. It is obvious that the invention may be embodied in many forms and constructions, and I wish it to be understood that the particular form shown is but a few of the many forms. Various modifications and changes being possible, I do not limit myself in any way with respect thereto.

What is claimed is:

1. A clamp having a frame, one end of which is bifurcated, a lever mounted between the bifurcations, a screw cooperatively associated with one end of the lever for swinging it about its pivot, the screw and adjacent end of the lever being housed between the bifurcations, and an abutment adjustably carried by the frame opposite the free end of the lever, the abutment being slidable along the frame when clamping pressure is released.

2. A clamp having a frame, a transverse lever pivotally mounted on one side of the frame and extending to the other side of the frame, a screw mounted in said other side of the frame, connections between the screw and lever for actuating the lever from the screw, the opposite end of the lever extending outwardly from the frame, the frame having a laterally extending bar, and an abutment member movably carried on the bar and having a free end opposite the outwardly extending end of the lever.

3. A clamp having a frame, a transverse lever pivotally mounted on one side of the frame and extending to the other side of the frame, a screw mounted in said other side of the frame, connections between the screw and lever for actuating the lever from the screw, the opposite end of the lever extending outwardly from the frame, the frame having a laterally extending bar, an abutment member movably carried on the bar and having a free end opposite the outwardly extended end of the lever, and means for covering the screw and connections with the lever.

4. A clamp having a frame, a transverse lever pivotally mounted on one side of the frame and extending to the other side of the frame, a screw mounted in said other side of the frame, a nut threaded on the screw and coupled with the lever to move the lever upon rotation of the screw, the opposite end of the lever extending outwardly from the frame, the frame having a laterally extending bar, and an abutment member movably carried on the bar and having a free end opposite the outwardly extended end of the lever.

5. A clamp having a bifurcated frame, a transverse lever pivotally mounted between the bifurcations, a screw carried between the bifurcations, connections between the screw and lever for actuating the lever from the screw, a cap covering the screw and connections, and an abutment opposite the free end of the lever.

6. A clamp having a frame provided with an opening, a screw mounted in opposite sides of the opening, a lever mounted on the frame and having one end movable in said opening, connections between the screw and lever for actuating the lever from the screw, the opposite end of the lever extending free from the frame, and a movable abutment member carried by the frame opposite the free end of the lever.

7. A clamp having a frame provided with an opening, a screw mounted in opposite sides of the opening, a lever mounted on the frame and having one end movable in said opening, connections between the screw and lever for actuating the lever from the screw, the opposite end of the lever extending free from the frame, and a movable abutment member carried by the frame opposite the free end of the lever, the screw having a head engageable with the side of the frame for taking the thrust.

8. A clamp having a frame provided with an opening, a screw mounted in opposite sides of the opening, a lever mounted on the frame and having one end movable in said opening, connections between the screw and lever for actuating the lever from the screw, the opposite end of the lever extending free from the frame, a movable abutment member carried by the frame opposite the free end of the lever, the screw having a head engageable with the side of the frame for taking the thrust, and a cap covering the opening in the frame and engaging the screw to prevent the removal of the screw.

HENRY MÜLLER